United States Patent [19]
Date et al.

[11] 4,351,595
[45] Sep. 28, 1982

[54] MOTOR DRIVE CAMERA

[75] Inventors: Nobuaki Date, Kawasaki; Nobuaki Sakurada, Yokohama; Masami Shimizu, Tokyo, all of Japan

[73] Assignee: Canon Kabushiki Kaisha, Tokyo, Japan

[21] Appl. No.: 279,225

[22] Filed: Jun. 30, 1981

[30] Foreign Application Priority Data

Jul. 3, 1980 [JP] Japan .................................. 55-91102
Jul. 3, 1980 [JP] Japan .................................. 55-91103

[51] Int. Cl.$^3$ .............................................. G03B 1/18
[52] U.S. Cl. .................................... 354/173; 354/171
[58] Field of Search ................................. 354/171, 173

[56] References Cited

U.S. PATENT DOCUMENTS

| | | | |
|---|---|---|---|
| 4,006,489 | 2/1977 | Aizawa et al. ...................... | 354/173 |
| 4,091,400 | 5/1978 | Land ................................... | 354/171 |
| 4,167,314 | 9/1979 | Ichiyanagi et al. ................. | 354/173 |
| 4,222,649 | 9/1980 | Niwa et al. .......................... | 354/173 |
| 4,294,530 | 10/1981 | Iwashita et al. .................... | 354/173 |

FOREIGN PATENT DOCUMENTS 54-105529 8/1979 Japan .................................. 354/173

*Primary Examiner*—Russell E. Adams
*Attorney, Agent, or Firm*—Toren, McGeady & Stanger

[57] ABSTRACT

A motor drive camera incorporates a motor drive device and a power source for the device and is adapted to mount a detachable auxiliary power source device to supply additional electric power to the motor drive device so as to raise the film winding up speed. The motor drive device includes a timer device whose operation is initiated at the same time as the initiation of power to the motor drive device and which effects the stop of power to the motor after the passage of a predetermined time. The operating time of the timer device is adapted to be changed in order to prevent the film from being damaged when mounting the auxiliary power source device to the camera.

9 Claims, 4 Drawing Figures

MOTOR DRIVE CAMERA

BACKGROUND OF THE INVENTION

1. Field of the Invention

The present invention relates to a motor drive camera, which carries out the film winding up, the film rewinding and the exposure operation by means of a motor drive device.

2. Description of the Prior Art

Quite recently, the camera with a built-in motor drive device has been brought to practice. What is most important is the balance between the efficiency of the winding up device and that of the camera. In order to raise the efficiency of the winding up device, it is necessary to increase the number of batteries to be built in the camera, while in order to increase the operativity of the camera it is necessary to make the camera compact. These demands are contradictory. In order to overcome this contradiction it has been proposed to mount the auxiliary power source if such a manner that in the operativity is the first consideration the winding up device is driven only by means of the power source built in the camera body. If the film winding up speed is the first consideration, the winding up device is also driven with the auxiliary power source mounted on the camera body. However, if the winding up speed of the winding motor is increased with the auxiliary power source, the following problems develop.

The time setting of the safety timer is the problem. Until now in order to avoid perforation damage at the end of the film in a camera with the built-in motor winding up device, a safety timer operatively engaged with the start of the motor is provided in the motor winding up device in such a manner that if a winding up finish signal is not produced, even after a certain predetermined winding up time has elapsed, the motor is stopped, on the assumption that the film has been finished or the power source voltage has been abnormally decreased.

Consequently, if by adopting the auxiliary power source the winding up time becomes shorter than in the case of power being supplied only from the camera body, the safety timer time set, in accordance with the winding up time, in the case of only the camera body is so long that there is a possibility that the film perforations may be damaged by the tension itself imposed on the film due to the earlier completion of the film winding up during the set time or due to some other causes during the film winding up. It is necessary for the photographer who uses such a camera to always take care of the number of remaining picture frames of the film, which is inconvenient.

In such a camera the rewinding speed of the film is also another problem.

Secondly, in case the film is rewound at a speed higher than a certain determined one, the static electricity takes place between the film and the press plate or between the film and the partone in such a manner that there is a damage that the film is exposed with a spark due to static electricity. Consequently, in the above-mentioned camera, where the auxiliary power source is utilized the voltage applied to the motor is higher so that when the film is rewound the rewinding speed is unnecessarily high, which causes inconvenience.

On the other hand, it is not necessary for the rewinding speed to be as high as with the winding up speed.

SUMMARY OF THE INVENTION

It is, accordingly, an object of the present invention to provide an improved motor drive camera which is associated with an auxiliary power source device.

It is another object of the invention to provide a motor drive camera so designed that the winding up device is driven also with the auxiliary power source in accordance with necessity, wherein if the operativity is the first consideration the winding up device is driven only with the power source built in the camera, while if the speed of the picture frames is taken into consideration the power source voltage to be supplied to the motor is raised by mounting the auxiliary power source on the camera, thereby the operation time of the safety timer is changed in operative engagement with the mounting of the auxiliary power source so as to prevent perforation damage at the finish of the film due to the change of speed of the picture frames.

It is yet another object of the present invention to provide a motor drive camera with a built-in motor winding up device, so designed that if the operativity is taken into the consideration the winding up device is driven only with the power source built in the camera body. If the speed of the picture frames is a primary consideration, the voltage to be applied to the motor is raised by mounting the auxiliary power source on the camera, wherein if the film is rewound with the auxiliary power device mounted on the camera, the voltage to be applied to the motor driving the film winding up is lower than that during the film rewinding in order that the film is rewound always at a speed lower than a certain predetermined speed so as to prevent exposure of the film during the rewinding due to static electricity.

These and further objects and features of the invention will become apparent from the following detailed description of an embodiment thereof taken in connection with the accompanying drawings.

DESCRIPTION OF THE PREFERRED EMBODIMENTS

The present invention will be explained in detail in accordance with the accompanying drawings.

Figure 1:
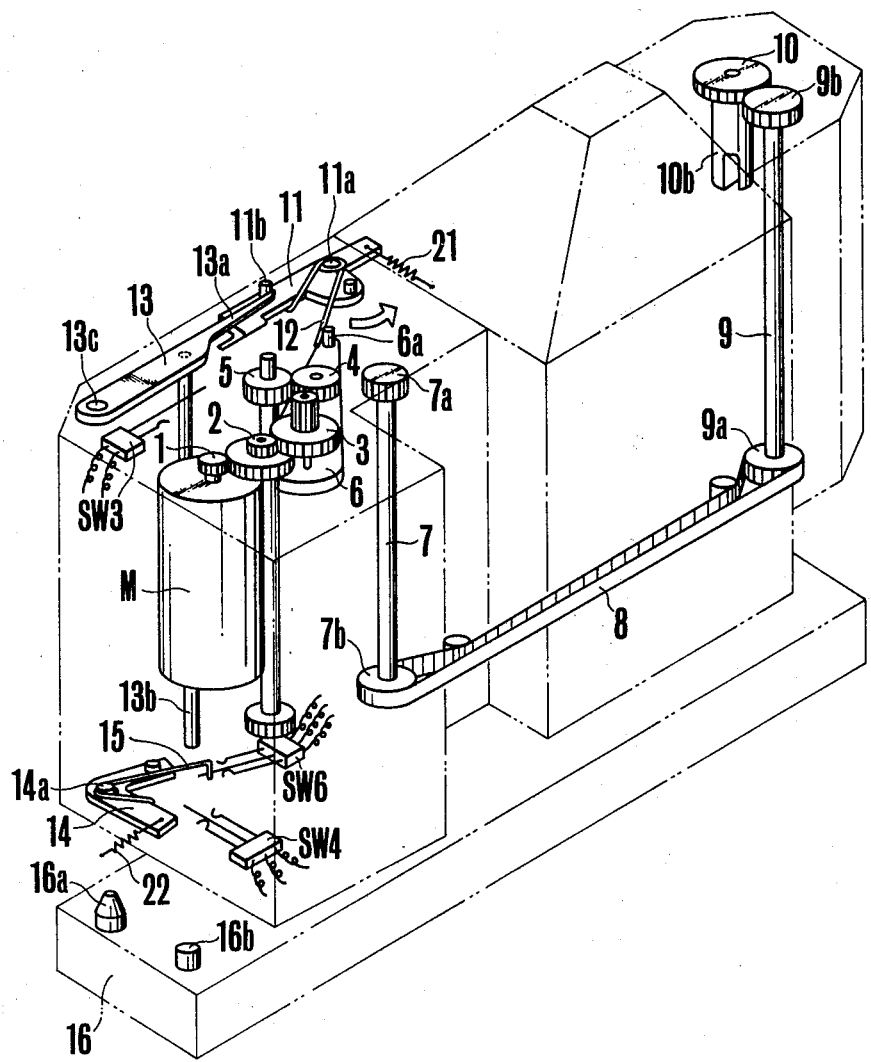
FIG. 1 shows the major parts of an embodiment of the motor drive camera of the invention in perspective view, with the auxiliary power source illustrated, but not not mounted.

In FIG. 1, M is a motor. On the motor M a motor pinion 1 is rotated in a counterclockwise direction. The rotation of the pinion 1 is transmitted through the reduction gears 2, 3 to the idler gear 4, provided on a change-over stand 6, is rotatable around the center of the rotational axis of the reduction gear 3.

Figure 2:
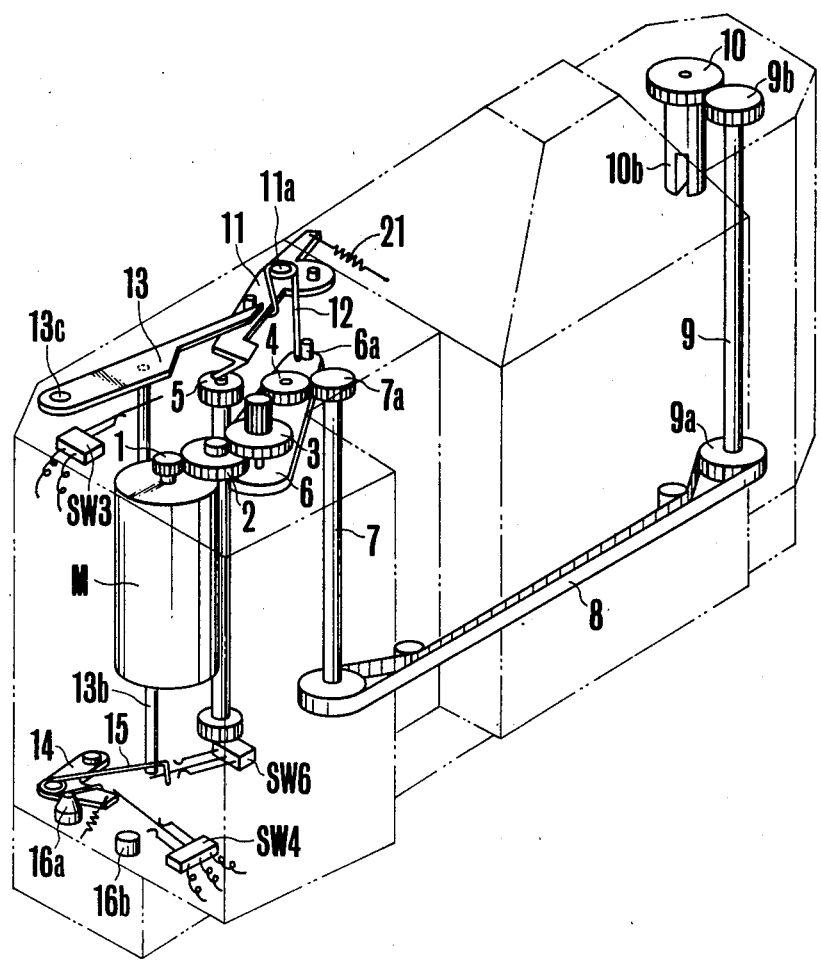
FIG. 2 shows the major parts of the embodiment shown in FIG. 1, with the auxiliary power source is mounted.

The idler gear 4 is alternately engaged with a sprocket gear 5 operating the winding up mechanism (not shown in the drawing) at the time of the film winding up and with a transmission gear 7a secured on the upper end of a first transmission shaft 7. The mechanism with be explained in greater detail hereafter. At the lower end of the first transmission shaft 7, a transmission gear 7b is also secured. The rotation of the first transmission shaft 7 is transmitted to a transmission gear 9a secured at the lower end of the second transmission shaft 9 through a toothed timing belt 8 so as to rotate a rewinding gear 10 engaged with the transmission gear 9b and operate a rewinding fork 10b in order to rewind the film (not shown). At the end of the change-over stand 6 a pin 6a is provided. A pin 6a is in contact with the other end of an absorption spring 12 which rotates around a point 11a, as is shown in FIG. 2. When the first change-over lever 11 is rotated along the direction of the arrow, such movement is against the bias of the spring 12 around the point 11a at the time of the film rewinding. The first change-over lever 11 is provided with a pin 11b so as to be in contact with an end 13b of a second change-over lever 13 rotatable around the point 13c, so that when the first change-over lever 11 is rotated along the direction of the arrow the contact of a rewinding change-over switch SW3 is closed by means of a switch change-over shaft 13b, as is shown in FIG. 2, while the top of an absorption lever 15 is pushed so as to prevent the change-over of a switch SW6.

Figure 3:
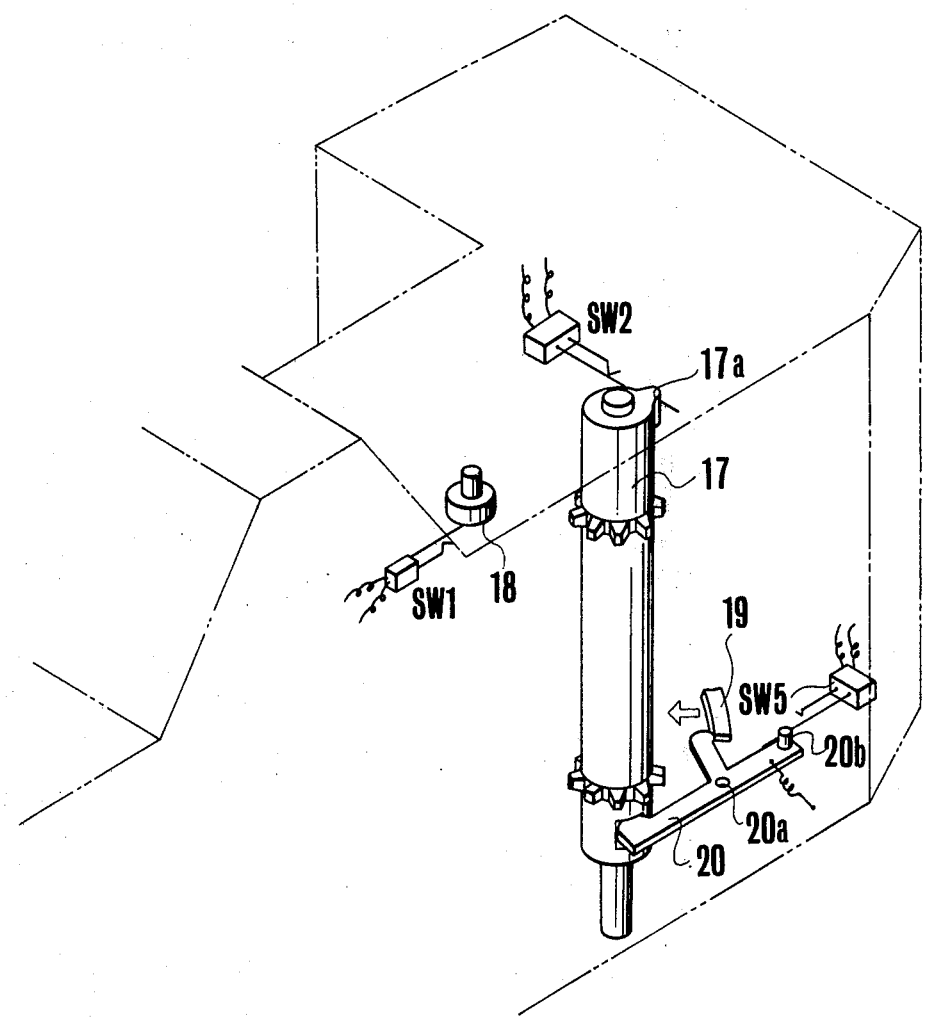
FIG. 3 shows the major parts of the sprocket portion of the motor drive camera shown in FIG. 1 in perspective view.

The auxiliary power source is identified by the numeral 16. At the upper end of the auxiliary power source pins 16a and 16b are provided. The top of the pin 16a is conically shaped. When the auxiliary power source 16 is mounted on the camera body, as is shown in FIG. 2, a power source change-over lever 14 is rotated against the bias of the spring 22 around the point 14a by means of the conical surface of the pin 16a in such a manner that the contact of the auxiliary change-over switch SW4 is changed-over by the end of the power source change-over lever 14, while the contact of the power source change-over switch SW6 is changed over by means of the top of the absorption spring 15 which rotates with the power source change-over lever 14. The pins 16a and 16b of the auxiliary power source 16 preferably are constructed so as to also serve as the power source terminals. In FIG. 3, the sprocket 17 for the film winding up is constructed in such a manner that when the trailing shutter signal lever 19 is moved in the direction of the arrow and a substantially T-shaped winding up finish lever 20 is rotated around the point 20a in a counterclockwise direction after the shutter action has been finished, a substantially semi-circular shaped top of a winding up finish lever 20 is disengaged out of the groove at the lower part of the sprocket 17 so as to enable film winding up, while the contact of the sprocket rotation detection switch SW2 is temporarily maintained by means of a projection at the upper part during each rotation.

At the other end of the winding up finish lever 20, a pin 20b is provided so as to keep the winding up finish switch SW5 in the closed state in accordance with the position of the winding up finish lever 20. The picture frame number set button is designated by the numeral 18. By operating the set button 18 the picture frame number set switch SW1 is closed so as to set the number of the picture frames of the loaded film.

Figure 4:
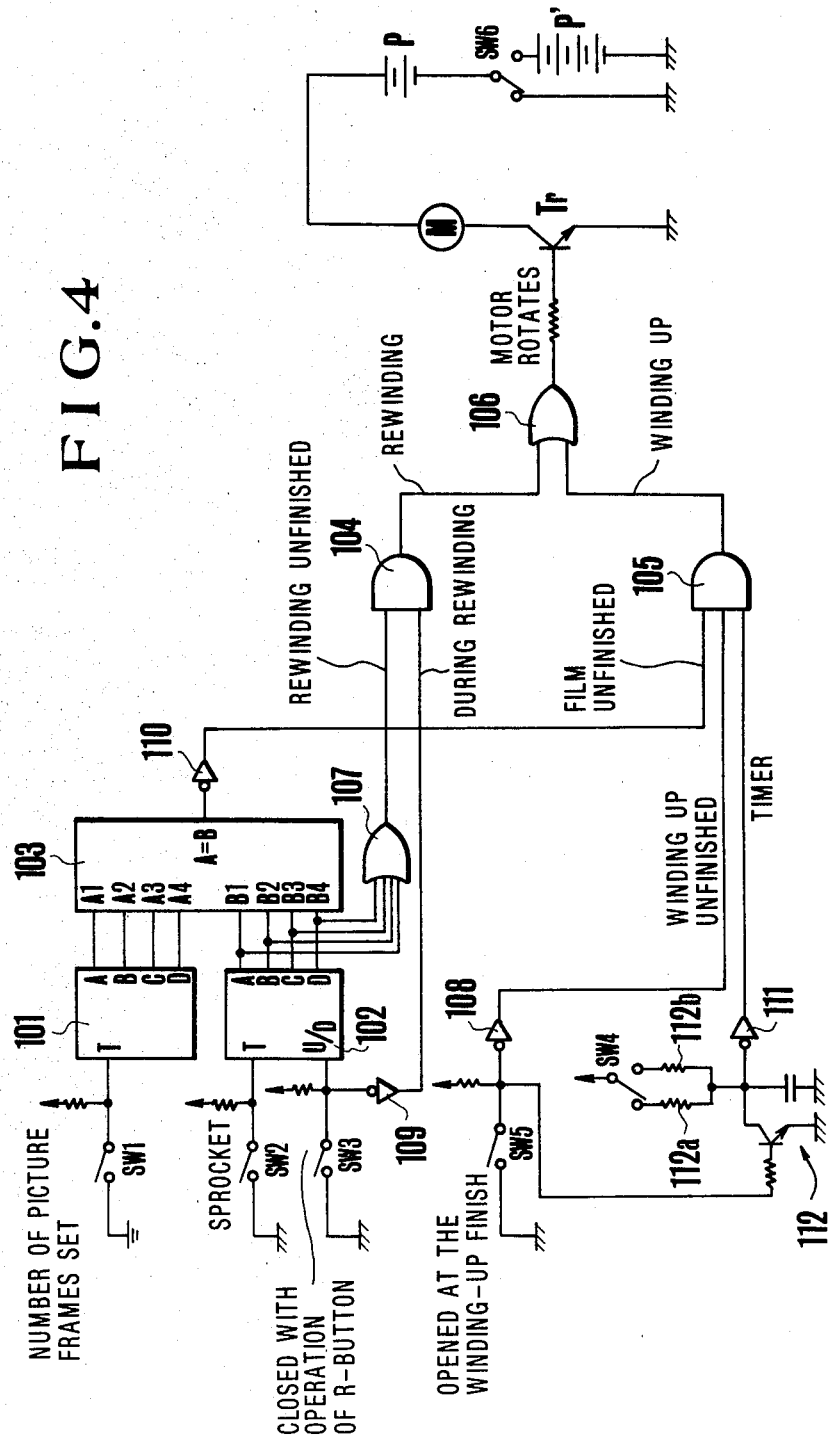
FIG. 4 shows a circuit diagram for the motor drive camera of the invention.

FIG. 4 shows the circuit for controlling the operation of the motor winding up device.

In the drawing, the counter 101 is provided for setting the number of picture frames of the loaded film. Each time the picture frame number set switch SW1 is closed, the picture frame number set button 18 is pushed and the L level signal is counted. The up and down counter 102 is provided for counting the number of the picture frame wound up, whereby the L level signal from the sprocket rotation detection switch SW2 to be operated at each rotation of the sprocket 17 is counted. The output terminal group A, B, C, D of the counter 101 and the output terminal group A, B, C, D of the counter 102 are respectively connected to the first input terminal group A1, A2, A3, A4 and the second input terminal group B1, B2, B3, B4 of the comparator 103 in such a manner that when the number of the picture frame of the loaded film corresponds to that of the wound up film, the comparator 103 delivers an L level signal to the AND gate 105 through the inverter 110. Thus, when in this state, the comparator 103 does not detect the coincidence (accordingly, the level of the output of the inverter 110 is H), the shutter release operation is carried out so as to allow the shutter to start to run in such a manner that the winding up finish lever 20 is rotated, and the winding up operation is started. With the rotation of the winding up finish lever 20 the winding up finish switch SW5 is closed, so that a H level signal is delivered to the AND gate 105 through the inverter 108, while the level of the output produced with the RC time constant circuit constituting a safety timer through the inverter 111 is also kept H during a certain predetermined time after the winding up finish switch SW5 has been moved. (The time has been set a little longer than that needed for the winding up device to wind up one of the picture frames of the film.) As the result, an H level signal is produced from the AND gate 105, while an H level signal is also produced from the OR gate 106 so that the transistor Tr is brought into the conductive state so as to allow the motor M to start to rotate. Thus, the sprocket 17 starts to wind up the film and actuates the sprocket rotation detecting switch SW2 during the rotation in such a manner that the up-down counter 102 counts up the number of the picture frames taken. When the winding up finish lever 20 is again engaged in the groove in the sprocket 17, the winding up finish switch SW5 is again opened while the inverter 108 produces an L level signal so that the motor stops rotating. Also when the number of picture frames of the loaded film corresponds to that of the wound up film, the comparator 103 delivers an L level signal to the AND gate 105 through the inverter 110 so that the motor M also stops rotating. On the other hand, when the number of picture frames of the loaded film is erroneourly set, the above-mentioned automatic stopping efficiency cannot be expected. In this case an L level signal is given to the AND gate 105 through the inverter 111 after the lapse of a certain time which has been made a little longer than the time necessary for one picture frame to be wound up, since the winding up finish switch SW5 has been closed till the RC time constant switch 112 starts to operate, the motor M stops rotating in order to prevent film perforation damage. For the case mentioned above the motor M is driven with the power source P built in the camera body and if the motor M is driven with the auxiliary power source P' the winding up speed of the picture frames is different because the rotation speed of the motor is different so that it is necessary to alter the operation time of the RC time constant circuit 112, namely the safety timer. Consequently, in accordance with the present invention, when the auxiliary power source 16 is mounted on the camera body, the auxiliary power source detecting switch SW4 is changed over by means of the power source change-over lever 14 to be rotated with the pin 16a, as is shown in FIG. 2, so as to select the resistances 112a and 112b in order to change the time constant of the RC time constant circuit into the constant corresponding to the winding up speed in case the auxiliary power source is used. Further, at this time the power source change-over switch SW6 is changed over to the side of the contact of the auxiliary power source P' by means of the top of the absorption spring 15 operatively engaged with the power source change-over lever 14 which is mounted for rotation.

Hereafter, the rewinding operation will be explained. When the rewinding lever 11 is brought out of the position shown in FIG. 1 into that shown in FIG. 2, the rewinding change-over switch SW3 is closed by means of the switch change-over shaft 13b, while the absorption spring 15, whose top is pushed, is rotated in the clockwise direction. Consequently, the power source switched switch SW6 is changed over to the ground terminal even if the auxiliary power source P' is mounted. Accordingly, when the change-over switch SW3 is in a closed state, an H level signal is delivered to the AND gate 104 through the inverter 109. The OR gate 107 which is supplied with the outputs from all the output terminals of the up-down counter 102 produces an H level signal because the content of the count of the up-down counter 102 is "0". Thus, the AND gate 104 produces an H level signal so as to bring the transistor Tr into the conductive state through the OR gate 106 in order to drive the motor M. Furthermore, at this time the output of the sprocket rotation detecting switch SW2 operated with the rotation of the sprocket 17 is counted down in the up-down counter 102. When the content of the up-down counter 102 becomes "0", the OR gate 107 produces an L level so as to stop the motor M. When the rewinding change-over, lever 11 is changed over the idle gear 4 is disengaged from the sprocket gear 5 and engaged with the transmission gear 7a. The disengagement and the engagement are carried out smoothly by means of the absorption spring 12 operatively engaged with the rewinding first change-over lever 11.

In accordance with the present invention, when the auxiliary power source is mounted on the camera with built-in motor drive device, the time constant of the RC time constant circuit constituting the safety timer is changed automatically upon operative engagement of the auxiliary power source so as to set the operation time of the safety timer in accordance with the film winding up speed. Thus even if the film winding up speed is changed the perforation damage at the finish of the film can be positively avoided.

Further, in accordance with the present invention, the change of the time of the safety timer is carried out by changing over the auxiliary power source detecting switch by means of the conical pin provided on the auxiliary power source device which is mounted on the camera body. The time change means is not necessarily limited to such a device and, for example, the time can be changed by detecting the voltage supplied to the motor when the auxiliary power source is mounted.

In the above embodiments the power supply to the timer circuit is started simultaneously with the start of the power supply to the motor. However, the present invention should not be limited to the simultaneous power supply to the timer circuit, but the power supply may be done in other ways.

Furthermore, in accordance with the present invention, if the film is mounted with the auxiliary power source device mounted on the camera, the current supply from the auxiliary power source is interrupted in operative engagement with the rewinding operation, so that if the auxiliary power source is mounted on the camera the voltage to be applied to the motor can be always kept constant with the power source built in the camera body and, therefore, the rewinding speed will not become so high that static electricity takes place between the film and the press-plate or between the film and the patrone so as to expose the film with a static electricity spark.

Furthermore, the above embodiments have been described mainly in connection with an electric motor, but the present invention should not be limited to an electric motor. An auxiliary mechanical driving device may be connected to a mechanical motor such as a spring motor for the purpose of changing over the timer time.

What is claimed is:

1. A motor drive camera comprising:
   a motor drive device;
     said motor drive device including a motor for winding up or rewinding the film; and
   a power source for said motor drive device;
     said camera being adapted to detachably connect an auxiliary power source device to supply additional power to the motor drive device, wherein said motor drive device further includes a timer device whose operation is initiated in relation to the initiation of power supply to the motor drive device and which effects the stop of the power supply to the motor at least after the passage of the time necessary to wind the film by one frame.

2. A motor drive camera according to claim 1, wherein said motor drive device further including a change-over means for changing the operation time of the timer device with the connecting of said auxiliary power source device.

3. A motor drive camera according to claim 1 or 2, wherein when the auxiliary power source device is mounted, said timer device has a shorter operating time than that when the auxiliary power device is detached.

4. A motor drive camera according to claim 3 wherein when rewinding the film, the motor of the motor drive device is adapted to rotate at the same speed irrespective of connecting and disconnecting of the auxiliary power source device.

5. A motor drive camera according to claim 3, wherein the power supply from the auxiliary power source to the motor of the winding up device is interrupted with the rewinding operation when the auxiliary power source device is connected.

6. A motor drive camera according to claim 5 wherein said motor is an electric motor and wherein said auxiliary power source device is formed to supply electric current into said electric motor.

7. A motor drive camera comprising:
   a camera body;
   a motor winding up device including a motor;
   a power source device, said power source device being built in said camera body and serving to supply current to said motor of said motor winding up device;
   an auxiliary power source, said auxiliary power source device being mountable on said camera body and serving to supply current to said motor winding up device when mounted on said camera;
   a timer device, said device starting to operate at the same time as the start of the current supply to the motor winding up device and interrupting the current supply to the motor winding up device after the lapse of a certain determined time after the operation starts; and a change-over means for changing the operation time of the timer device when the auxiliary power source device is mounted.

8. A motor drive camera with a removable auxiliary power source device, so designed that when the operativity is a primary consideration the winding up device is driven by means of the power source device built in the camera body, and when the speed of the picture frame is a primary consideration the auxiliary power source is mounted on the camera body so as to raise the voltage to be applied to the winding up device and the current supply from the auxiliary power source device to the motor winding up device is interrupted during at least some operating conditions.

9. A motor drive camera comprising:

a motor drive device;
    said motor drive device including a motor for winding up and rewinding the film; and
a power source for said motor drive device;
    said camera being adapted to detachably mount an auxiliary power source device to supply a further electric power to said motor drive device, wherein said motor drive device further includes a timer device whose operation is initiated at the same time of the initiation of power supplying to the motor drive device and which effects the stop of power supply to the motor at least after the passage of substantially the time necessary to wind the film by one frame.

* * * * *